United States Patent
Yamane

(10) Patent No.: US 7,280,287 B2
(45) Date of Patent: Oct. 9, 2007

(54) ZOOM LENS APPARATUS

(75) Inventor: Kenji Yamane, Saitama (JP)

(73) Assignee: Fujinon Corporation, Saitama-shi (JP)

(*) Notice: Subject to any disclaimer, the term of this patent is extended or adjusted under 35 U.S.C. 154(b) by 9 days.

(21) Appl. No.: 11/389,145

(22) Filed: Mar. 27, 2006

(65) Prior Publication Data
US 2006/0221466 A1    Oct. 5, 2006

(30) Foreign Application Priority Data
Mar. 28, 2005    (JP) ............ P.2005-092454

(51) Int. Cl.
*G02B 15/22* (2006.01)
*G03B 13/10* (2006.01)
(52) U.S. Cl. .................. 359/698; 396/379
(58) Field of Classification Search ........... 359/691
See application file for complete search history.

(56) References Cited
U.S. PATENT DOCUMENTS
2002/0071674 A1 * 6/2002 Omiya .............. 396/379

FOREIGN PATENT DOCUMENTS
JP        9-49958 A    2/1997
JP        11-64708 A    3/1999

* cited by examiner

*Primary Examiner*—Jordan Schwartz
*Assistant Examiner*—James C Jones
(74) *Attorney, Agent, or Firm*—Birch, Stewart, Kolasch & Birch, LLP

(57) ABSTRACT

A zoom lens apparatus is provided. In the zoom lens apparatus, rotation of a motor is transmitted to a cam drive gear by reducing a speed thereof by a plurality of reduction gears. The cam drive gear transmits rotation thereof to a zoom cam provided coaxially therewith. A first lens group and a second lens group are moved in an optical axis direction by rotation of the zoom cam to carry out zoom adjusting. An interval between the cam drive gear and the zoom cam is provided with a nontransmitting section in which rotation of the cam drive gear is not transmitted to the zoom cam when a rotational direction of the cam drive gear is switched, by rotation of the cam drive gear in the nontransmitting section, the zoom cam is slid in an axial direction. Thereby, also the first lens group and the second lens group connected and engaged with the zoom cam are moved in the optical axis direction along therewith to adjust a focus.

10 Claims, 16 Drawing Sheets

ZOOM LENS APPARATUS

FIELD OF THE INVENTION

The present invention relates to a zoom lens apparatus integrated to a small-sized electronic apparatus of a cellular phone or the like, further in details, relates to a zoom lens apparatus capable of changing a magnification and focusing by a single motor.

BACKGROUND OF THE INVENTION

A cellular phone with a camera including a digital camera has been spread. A cellular phone with a camera of a background art uses an image taking lens having a single focus and an image sensor having a low resolution for small-sized formation and a reduction in cost. However, there are a number of users requesting a high image quality image taking function for a cellular phone with a camera and therefore, in recent years, a cellular phone with a camera using optical zooming and automatic focusing, an image sensor having a large number of pixels or the like is also on sale.

A zoom lens apparatus needs a minimum of two lens groups movable in an optical axis direction. Further, there is needed a lens driving mechanism capable of individually moving respective lens groups in zoom adjusting, moving only one lens group in adjusting focus, or moving two lens groups in the same direction and by the same amount. A digital camera integrated to a cellular phone with a camera is very small-sized and therefore, a zoom lens apparatus of a lens barrel type which needs to form a fine cam groove at an outer periphery thereof cannot be used. Further, a zoom lens apparatus of an outer zoom type in which a lens barrel is extracted to outside of a cellular phone with a camera by zoom adjusting is not suitable for a cellular phone with a camera which is frequently handled roughly.

Hence, a cellular phone with a camera having optical zoom of a background art uses a lens driving mechanism of an inner zoom type attaching nuts to two lens groups held to be movable in an optical axis direction, and screwing feed screws in a rod-like shape to the nuts and rotating the feed screws by a motor. However, when two lens driving mechanisms are integrated for zooming and focusing, an influence on a size and cost of the cellular phone with a camera is considerable.

In order to constitute a camera by a small-sized formation and low cost formation, a zoom lens capable of adjusting zooming and focusing by a single lens driving mechanism has been invented. For example, according to a zoom lens apparatus described in JP-A-11-064708, a cam ring rotated at an outer periphery of a fixed cylinder is formed with two pieces of cam grooves inserted with cam followers of two pieces of lens groups integrated to inside of the fixed cylinder, a width of one cam groove thereof is made to be wider than that of the other. In rotating the cam ring in one direction, the respective lens groups are moved in an optical axis direction by the respective cam grooves to perform zoom adjusting. When the cam ring is rotated in other direction, the lens group engaged with the cam groove having a narrow width follows the cam groove to move, the lens group engaged with the cam groove having the wide width is not moved until the cam groove is brought into contact with the cam follower and therefore, focus adjusting is performed in a state in which a zoom magnification is not varied.

Further, according to a zoom lens apparatus described in JP-A-09-049958, there is provided an engageable and disengageable rotation transmitting mechanism between a middle cylinder for moving a front group lens by rotation and a cam cylinder provided coaxially with the middle cylinder for moving a rear group lens for executing zoom adjusting by rotating both of the middle cylinder and the cam cylinder when engaged and for executing focus adjusting by stopping to rotate the cam cylinder and rotating only the middle cylinder over a predetermined angular range when not engaged.

According to the zoom lens apparatus described in JP-A-11-064708 and JP-A-09-049958, the single piece of motor can be used both for zoom adjusting and focus adjusting and therefore, the apparatus can contribute to small-sized formation and low cost formation of the cellular phone with a camera. However, both of the apparatus are of the outer zoom type using the lens barrel and extracting the lens barrel to a front side in zoom adjusting and therefore, the apparatus are not suitable for the cellular phone with a camera.

SUMMARY OF THE INVENTION

An object of an illustrative, non-limiting embodiment of the invention is to provide a zoom lens apparatus of an inner zoom type which is small-sized at low cost capable of being used in a cellular phone with a camera.

A zoom lens apparatus according to an exemplary embodiment of the invention includes: a cam drive gear rotated in a first direction by regularly rotating a motor and rotated in a second direction by reversely rotating the motor; a zoom cam rotatably and slidably supported on a rotational axis in parallel with an optical axis and connected and engaged with a first lens group and a second lens group to move in an optical axis direction; and a connecting and engaging mechanism provided between the cam drive gear and the zoom cam, the connecting and engaging mechanism transmitting rotation in the first direction and rotation in the second direction of the cam drive gear to the zoom cam to perform zoom adjusting, having a nontransmitting section in which rotation of the cam drive gear is not transmitted to the zoom cam when a rotational direction is switched between the first direction and the second direction, and sliding the zoom cam in the axial direction by rotation of the cam drive gear in the nontransmitting section to perform focus adjusting. According thereto, zoom adjusting and focus adjusting of the zoom lens apparatus can be carried out by one motor and one connecting and engaging mechanism and therefore, small-sized formation and low cost formation can be achieved.

Further, the cam drive gear and the zoom cam are coaxially provided, the zoom cam is arranged to be proximate to sides of the first lens group and the second lens group, at least one reduction gear for transmitting rotation of the motor to the cam drive gear is arranged coaxially with the zoom cam and therefore, rotating shafts, bearing portions or the like necessary therefor can be omitted and the apparatus can be downsized.

Further, the zoom cam may include a first zoom cam for moving the first lens group in the optical axis direction and a second zoom cam for moving the second lens group in the optical axis direction, and the cam drive gear may be arranged between the cams. According thereto, in focus adjusting, only one of the zoom cams can be moved.

Further, a cam cylinder in a cylindrical shape contained with lens groups at inside thereof may be used as the zoom cam. In this case, as supporting unit, a fixed cylinder for supporting the first lens group and the second lens group contained at inside thereof to be able to move in the optical axis direction is used. As the zoom cam, a cam cylinder in a cylindrical shape rotatably and slidably inserted through an outer periphery of the fixed cylinder and formed with cam grooves inserted with cam followers of the first lens group and the second lens group at an outer periphery thereof is used. And as the cam drive gear, a cam drive gear in a ring-like shape having an opening rotatably inserted through the outer periphery of the fixed cylinder is used. Further, by rotating the cam cylinder by the connecting and engaging mechanism, the first lens group and the second lens group are moved in the optical axis direction to perform zoom adjusting, and focus adjusting is performed by sliding the cam cylinder on the fixed cylinder by the connecting and engaging mechanism. According thereto, the zoom lens apparatus can be downsized more than that when the lens group and the zoom cam are arranged to be proximate to each other.

Further, when the cam cylinder is rotated in sliding the cam cylinder on the fixed cylinder in focus adjusting, a zoom magnification is changed. In this case, a zoom lens apparatus of a step type in which the cam cylinder is stopped at a plurality of stopping positions may be constituted. Further, a plurality of grooves or a plurality of projections in correspondence with the positions of stopping the cam cylinder are provided at either one of the fixed cylinder and the cam cylinder, other thereof is provided with projections inserted to the grooves or grooves inserted with the projections when the cam cylinder is moved in the optical axis direction in focus adjusting. (That is, a plurality of grooves in correspondence with the stopping positions of the cam cylinder are provided at one of the fixed cylinder and the cam cylinder, a plurality of projections is provided at the other of the fixed cylinder and the cam cylinder, and the plurality of projections are inserted to the plurality of grooves when the cam cylinder slides on the fixed cylinder in focus adjusting.) Thereby, the cam cylinder can be prevented from being rotated in focus adjusting.

The connecting and engaging mechanism may include: a first connecting and engaging provided at either one of the cam drive gear and the zoom cam; a cam follower; a second connecting and engaging member provided at other thereof, brought into contact with the first connecting and engaging member when the cam drive gear is rotated in the first direction to transmit rotation of the cam drive gear to the zoom cam; a third connecting and engaging member arranged at a position remote from the second connecting and engaging member by more than a width of the first connecting and engaging member, brought into contact with the first connecting and engaging member when the cam drive gear is rotated in the second direction to transmit rotation of the cam drive gear to the zoom cam; and a focus cam provided between the second connecting and engaging member and the third connecting and engaging member, and pressed by the cam follower during a time period until the first connecting and engaging member and the second or the third connecting and engaging member are brought into contact with each other after switching a rotational direction of the cam drive gear. The focus cam includes a cam face a position of a face of which is changed in the axial direction of the zoom cam and therefore, by pressing the focus cam by the cam follower, the zoom cam is slid in the axial direction. In this way, the connecting and engaging mechanism can be constituted by parts provided to the cam drive gear and the zoom cam and therefore, there is not brought about an increase in an integrating space, an increase in cost or the like by an increase in a number of parts.

Further, a friction F provided to the zoom cam in the rotational direction, a rotational torque T1 generated when the cam drive gear rotates the zoom cam, and a rotational torque T2 generated in the rotational direction of the zoom cam when the cam follower presses the focus cam satisfy a relationship of T1>F>T2. Thereby, the zoom cam can firmly be slid by the connecting and engaging mechanism.

According to a zoom lens apparatus of an exemplary embodiment of the invention, zoom adjusting and focus adjusting can be performed by using one piece of the motor and one piece of the connecting and engaging mechanism, constituent parts can be made to be as few as possible and as small as possible and therefore, the invention can contribute to small-sized formation and low cost formation of a cellular phone with a camera or the like in which the zoom lens apparatus of the invention is used.

DETAILED DESCRIPTION OF THE INVENTION

Figure 1:
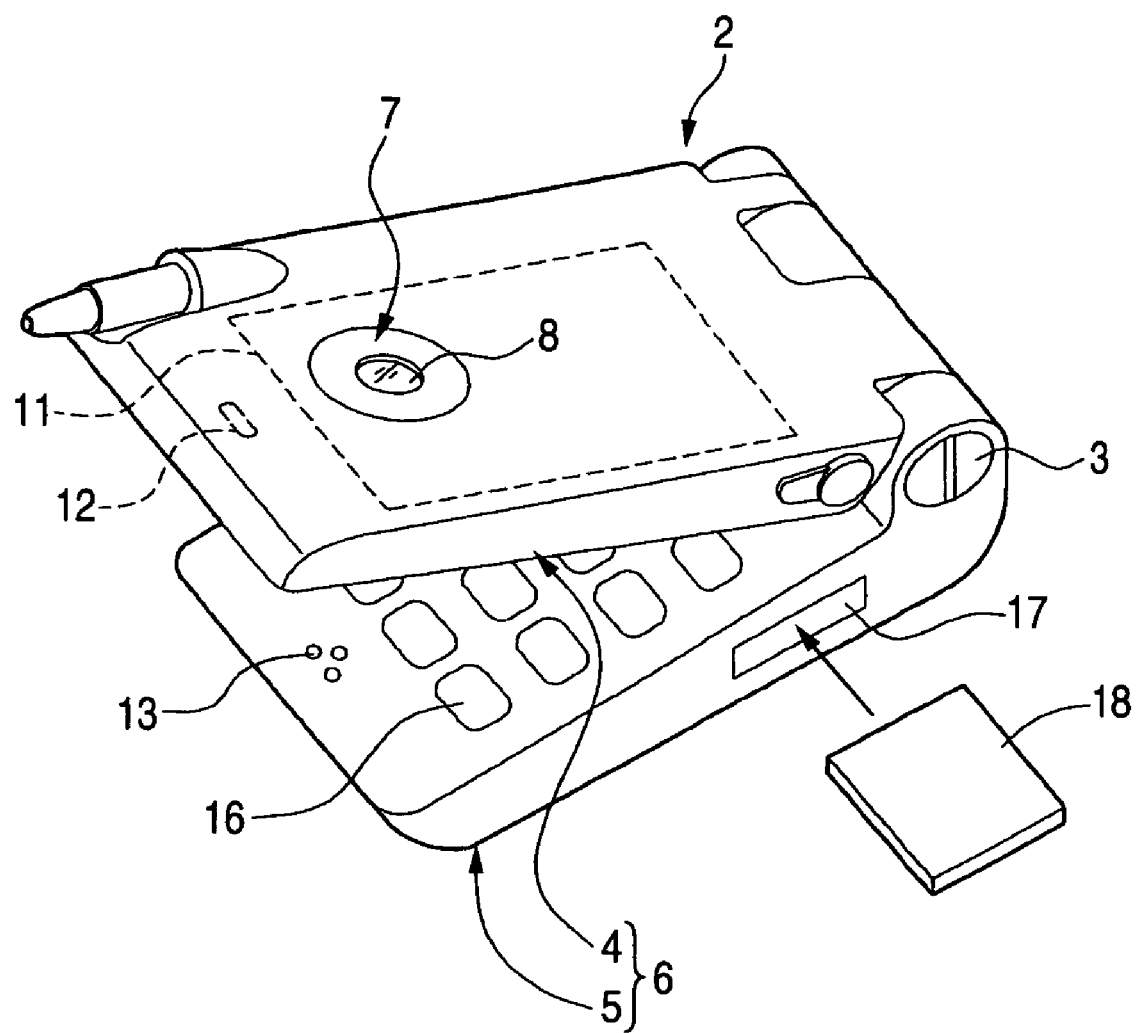
FIG. 1 is a perspective view showing an outlook shape of a cellular phone with a camera using a zoom lens apparatus of an exemplary embodiment of the invention.
Figure 2:
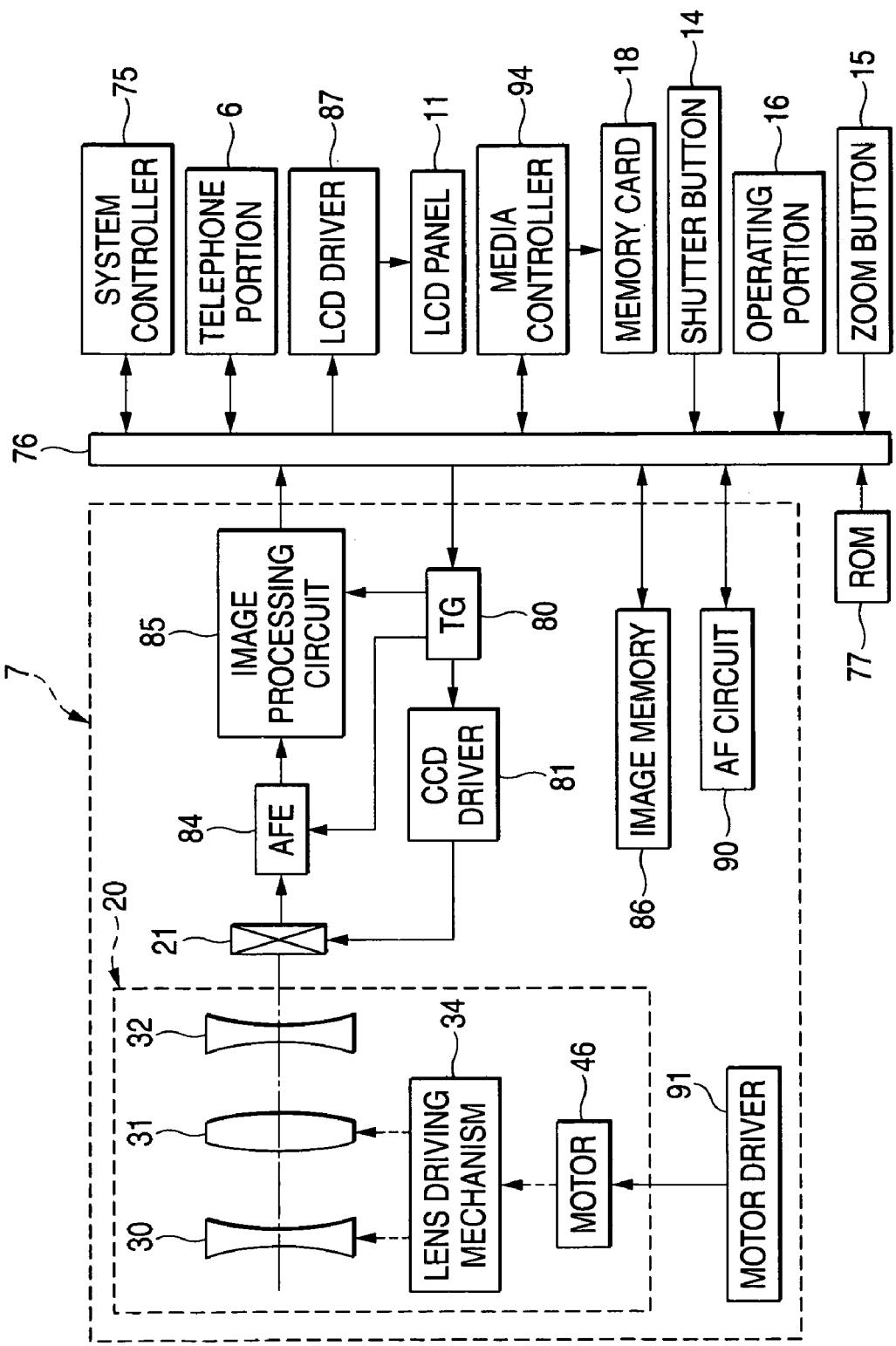
FIG. 2 is a block diagram showing a constitution of a cellular phone with a camera.

FIG. 1 and FIG. 2 are an outlook view and a block diagram, showing a constitution of a cellular phone with a camera according to an exemplary embodiment of the invention. A cellular phone with a camera 2 is constituted by a telephone portion 6 comprising a receiving portion 4 and a transmitting portion 5 connected foldably by a hinge portion 3 and a camera portion 7 constituting a digital camera integrated at inside of the receiving portion 4. At an outer face of the receiving portion 4, a transparent protecting plate 8 for protecting a zoom lens apparatus of the camera portion 7 is exposed to outside.

An inner face side of the receiving portion 4 is provided with a liquid crystal display (LCD) panel 11 displayed with various information with regard to telephone of an address list, telephone numbers or the like, and an image or the like taken by the camera portion 7, and a receiving speaker 12. An inner face side of the transmitting portion 5 is provided with a transmitting microphone 13 as well as an operating portion 16 comprising a dial button for dial operation in transmitting and various set buttons, a shutter button 14, a zoom button 15 and the like operated in taking an image. When a memory card 18 is charged to a card slot 17 provided at a side face of the transmitting portion 5, an image taken by the camera portion 7 can be reserved to the memory card 18 as an image data.

Figure 3:
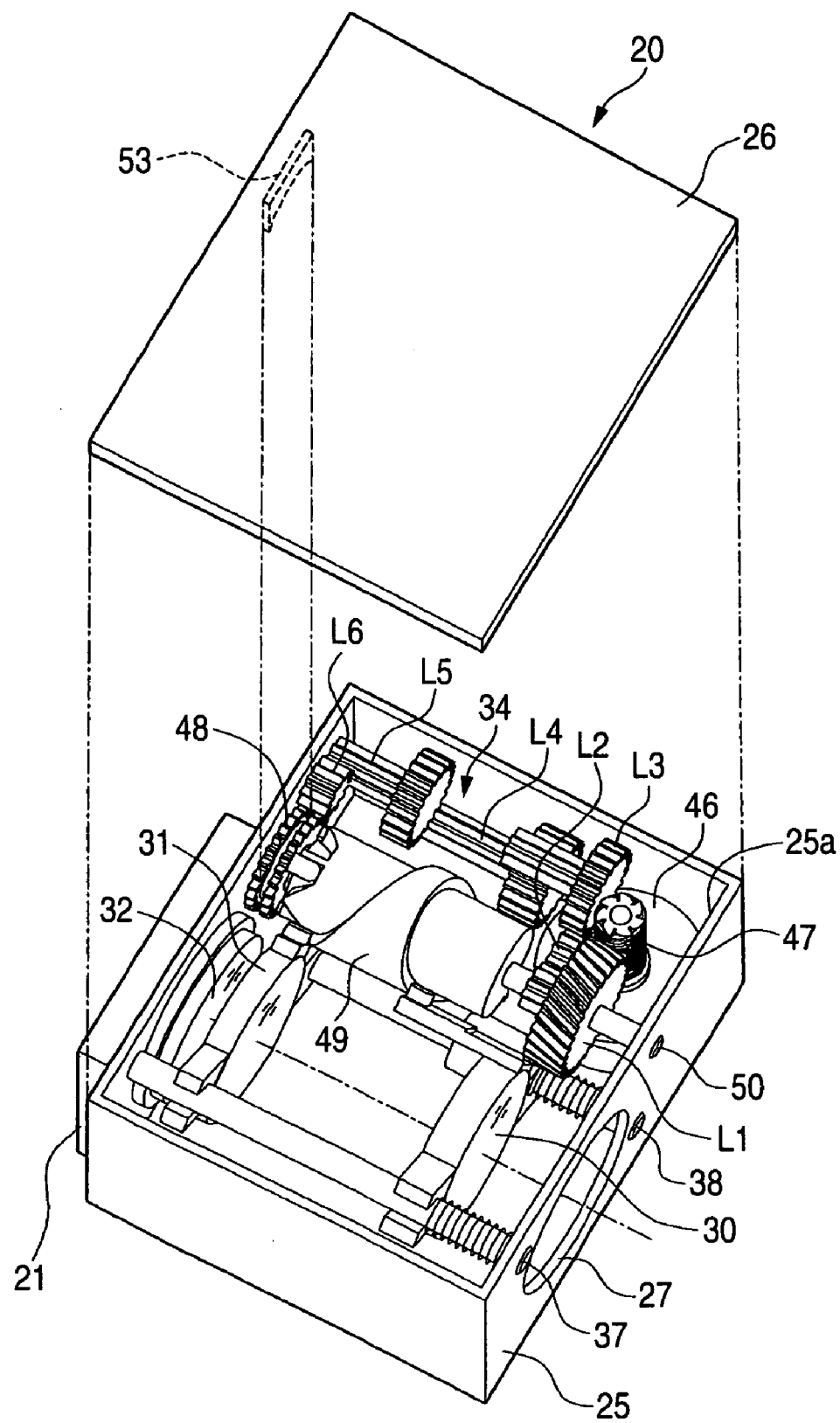
FIG. 3 is a perspective view showing an outlook shape of a zoom lens apparatus according to a first exemplary embodiment.

FIG. 3 is a perspective view showing an outlook shape of the camera portion 7. The camera portion 7 is constituted by a zoom lens apparatus 20 and an image sensor 21 attached to an outer side of the zoom lens apparatus 20. Although the image sensor 21 of, for example, a CCD type is used, an image sensor of a CMOS type may be used.

Figure 4:
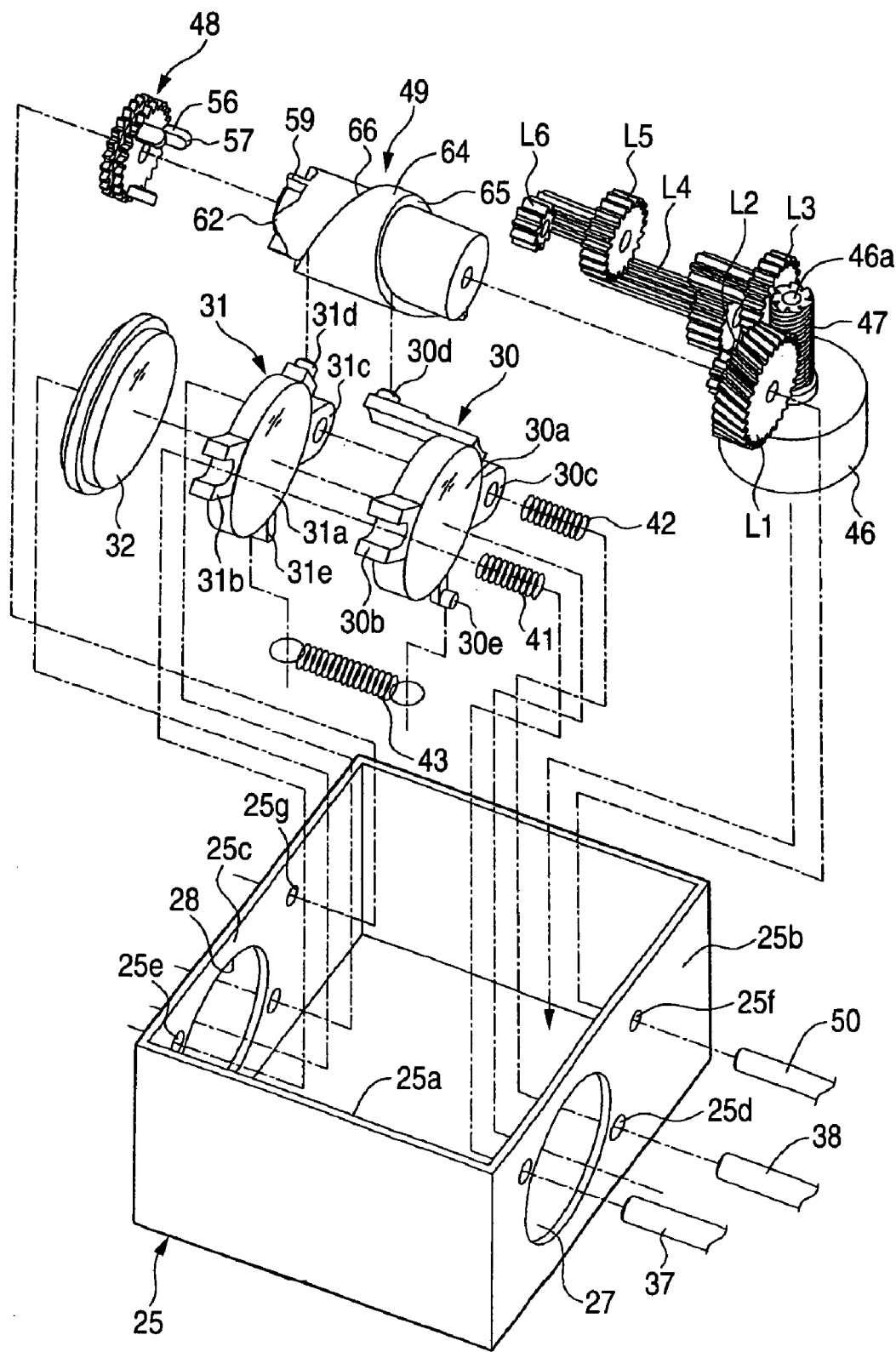
FIG. 4 is a disassembled perspective view showing a constitution of the zoom lens apparatus.

The zoom lens apparatus 20 comprises a lens cabinet 25 in a box-like shape compactly integrated with constituent parts at inside thereof and a lid member 26 for closing an opening 25a of an upper face of the lens cabinet 25. As shown by FIG. 4, a front face 25b and a rear face 25c of the lens cabinet 25 are provided with circular image taking openings 27, 28 opposed to the protecting plate 8 and the image sensor 21 for passing object light. A first through a third lens group 30 through 32 constituting a zoom lens are integrated between the image taking openings 27 and 28. The third lens group 32 is fitted to the image taking opening 28 to be fixedly attached thereto. Further, a lens driving mechanism 34 (refer to FIG. 3) for moving the first lens group 30 and the second lens group 31 along an image taking optical axis are integrated to sides thereof.

The first lens group 30 and the second lens group 31 are provided with lens portions 30a, 31a, bearing portions 30b, 30c, 31b, 31c, and followers 30d, 31d in a pin-like shape projected to an outer peripheral direction, spring engaging pieces 30e, 31e integrally by a transparent plastic. The first lens group 30 and the second lens group 31 are supported movably in the image taking optical axis direction by inserting slide shafts 37, 38 into the bearing portions 30b, 30c, 31b, 31c. The slide shafts 37, 38 are axially supported by bearing holes 25d, 25e formed at the front face 25b and the rear face 25c of the lens cabinet 25.

Press springs 41, 42 inserted through the slide shafts 37, 38 are brought into contact with front faces of the bearing portions 30b, 30c of the first lens group 30 to press the first lens group 30 to a rear side of the image taking optical axis. Spring engaging pieces 30e, 31e are engaged with a tension springs 43 for urging the first lens group 30 and the second lens group 31 in directions of being proximate to each other.

The lens driving mechanism 34 is constituted by a motor 46, a motor gear 47 constituting a worm gear attached to a rotating shaft 46a of the motor 46, a worm wheel L1 for converting a direction of rotating the motor gear 47 in a direction orthogonal thereto by 90°, a plurality of reduction gears L2 through L6 for transmitting rotation of the worm wheel L1 by reducing a speed thereof, a cam drive gear 48 rotated by the reduction gear L6, a zoom cam 49 in a cylindrical shape rotated by the cam drive gear 48. The motor 46 is a pulse motor which is rotated when zoom adjusting is carried out by operating the zoom button 15, or when focus adjusting is carried out by pressing the shutter button 14 by a half thereof.

The worm wheel L1 and the cam drive gear 48 are rotatably supported by a rotating shaft 50 and the zoom cam 49 is rotatably and slidably supported by the rotating shaft 50. The rotating shaft 50 is fixedly attached to bearing holes 25f, 25g formed at the front face 25b and the rear face 25c of the lens cabinet 25. By supporting the two gears L1, 48 and the zoom cam 49 coaxially in this way, a number of parts of the zoom lens apparatus 20 can be reduced, which can contribute to small-sized formation and low cost formation. Further, although not illustrated to avoid complicated formation of the drawings, the motor 46, and the reduction gears L2 through L6 are supported by well-known bosses and the bearing portions provided at the lens cabinet 25 and the lid member 26.

Figure 5:
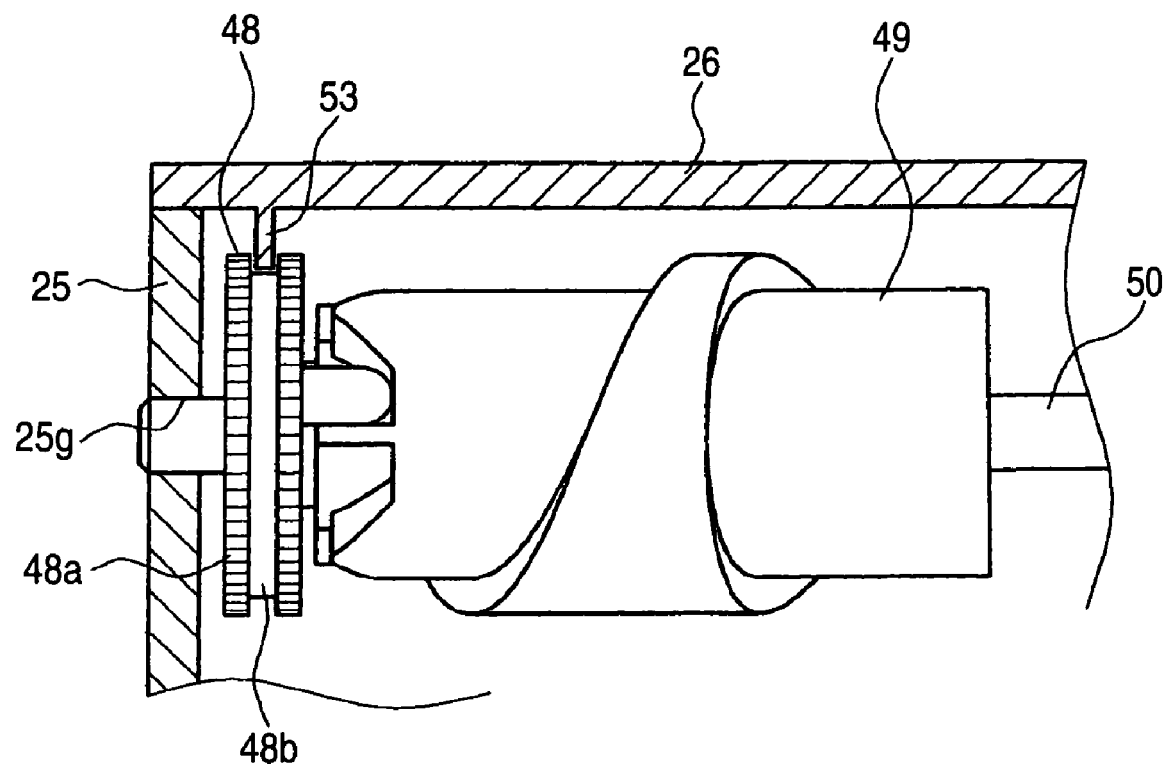
FIG. 5 is a sectional view showing a state of axially supporting a zoom cam.

As shown by FIG. 5, the cam drive gear 48 is formed with a groove portion 48b which is not formed with a teeth row at a center of teeth face portions of gear portions 48a brought in mesh with the reduction gear L6. Inside of the groove portion 48b is inserted with a rib 53 constituting a restricting member provided at an inner face of the lid member 26. Thereby, movement in an axial direction of the cam drive gear 48 is restricted. Further, an end face of the rib 53 is formed in a shape of a circular arc in accordance with a curved face of the groove portion 48b and therefore, even when a width of the rib 53 is narrow, the cam drive gear 48 can be prevented from being slid firmly. Further, by attaching the rid member 26 to the lens cabinet 25, the rib 53 is inserted into the groove portion 48b of the cam drive gear 48 and therefore, a number of integrating steps is not increased.

Figure 6:
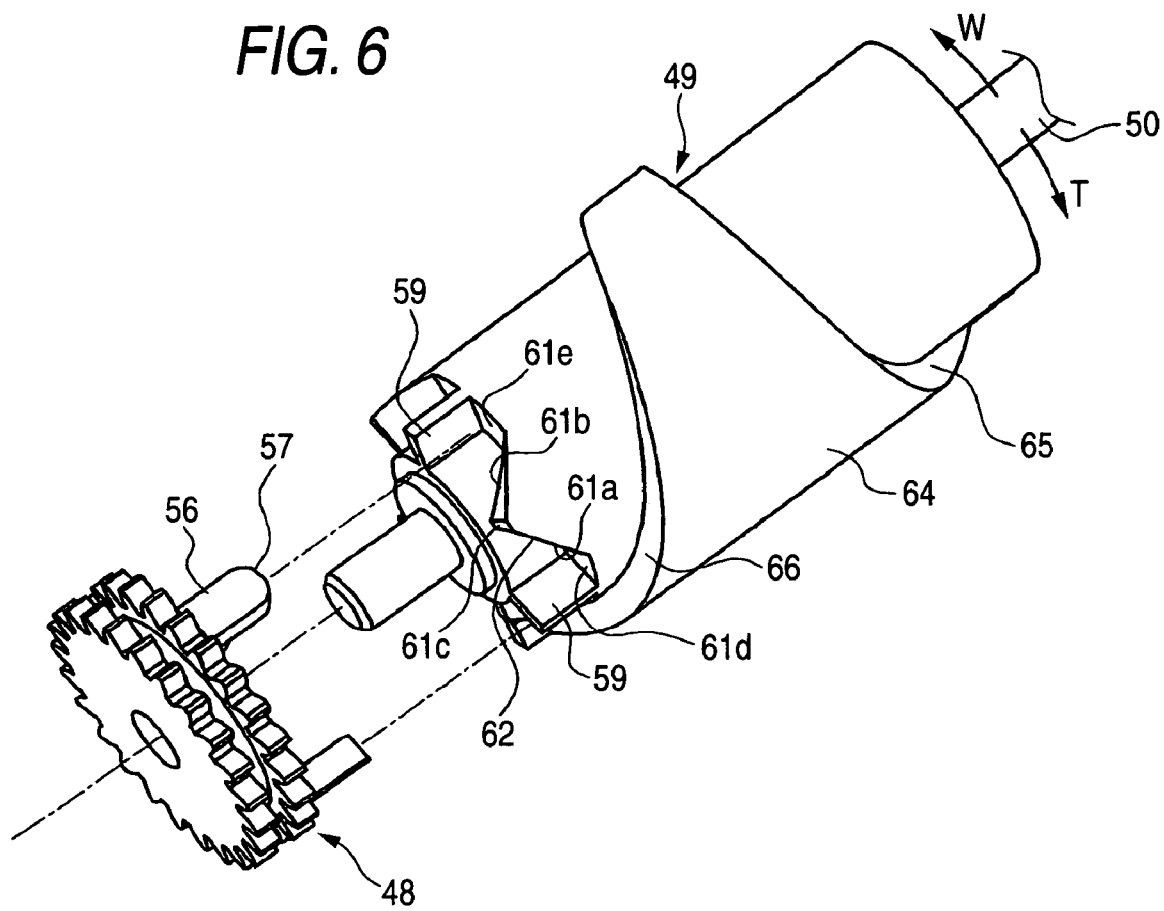
FIG. 6 is a perspective view showing a constitution of mechanism of connecting and engaging a cam drive gear and a zoom cam.
Figure 7A:
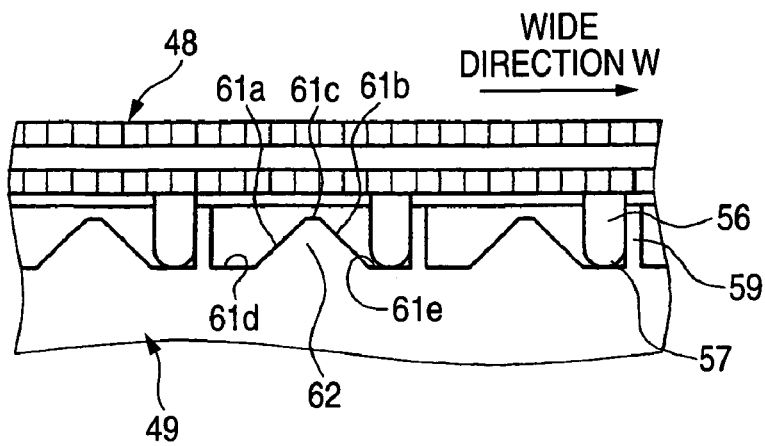
FIGS. 7A to 7C illustrate explanatory views showing states of connecting and engaging the cam drive gear and the zoom cam.

As shown by FIG. 6 and FIG. 7A constituting a view of developing the cam drive gear 48 and the zoom cam 49, an end face of the cam drive gear 48 on a side facing the zoom cam 49 is provided with 3 pieces of cooperatively moving bosses 56 in a projected shape projected along an axial direction and arranged in a rotational direction at constant angles. The cooperatively moving boss 56 is a first connecting and engaging member constituting a connecting and engaging mechanism and a front end of each cooperatively moving boss 56 is integrally formed with a cam follower 57 in a shape of a circular arc.

An end face of the zoom cam 49 on a side facing the cam drive gear 48 is formed with 3 pieces of connecting projections 59 projected in the axial direction and arranged in the rotational direction at constant angles. The connecting projection 59 is arranged more remotely than a width dimension of the cooperatively moving boss 56 to operate the cooperatively moving boss 56 as a second connecting and engaging member and a third connecting and engaging member. Focus cams 62 substantially in a triangular shape each comprising two inclined faces 61a, 61b, a top face 61c provided continuously to both of the inclined faces 61a, 61b and provided of a position proximate to the cam drive gear 48, and bottom faces 61d, 61e provided continuously to the connecting projections 59 and the respective inclined faces

61*a*, 61*b* are respectively provided between the respective connecting projections 59. The bottom faces 61*d*, 61*e* are disposed at the same position in the optical axis direction for executing zoom adjusting from telephoto to wide by rotating the zoom cam 49 in the clockwise direction of FIG. 4, executing zoom adjusting from wide to telephoto by rotating the zoom cam 49 in the counterclockwise direction, disposing the bottom faces 61*d*, 61*e* at the both ends at the same position (for example, infinite), and constituting a different distance (for example, closest) at the vicinities of the top face 61*c* of the respective inclined faces 61*a*, 61*b*.

Figure 8:
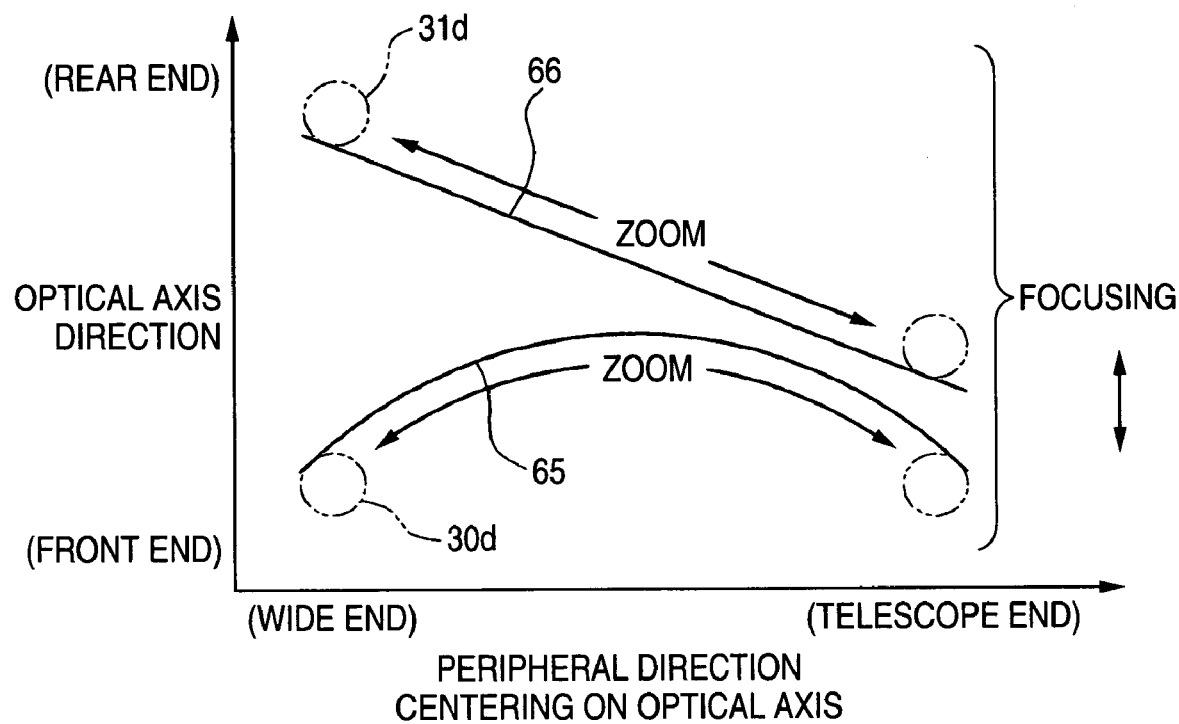
FIG. 8 is a development view of respective cam faces of the zoom cam.

An outer peripheral face of the zoom cam 49 is provided with a cam portion 64 projected in the outer peripheral direction, and end faces of the cam portion 64 are provided with a first cam face 65 and a second cam face 66. As shown by FIG. 8 constituting a view of developing the cam faces 65, 66, the first cam face 65 is provided with a shape of a circular arc both end portions of which are arranged at the same portion in the optical axis direction, and the second cam face 66 is provided with an inclination of a linear line from a wide end to a telephoto end.

At the first lens group 30, the cam follower 30*d* provided to be offset on a rear side in the optical axis direction is brought into contact with the first cam face 65 by being pressed by the press springs 41, 42. At the second lens group 31, the cam follower 31*d* provided at the outer periphery is brought into contact with the second cam face 66 by being pulled by the tension spring 43.

Figure 7B:
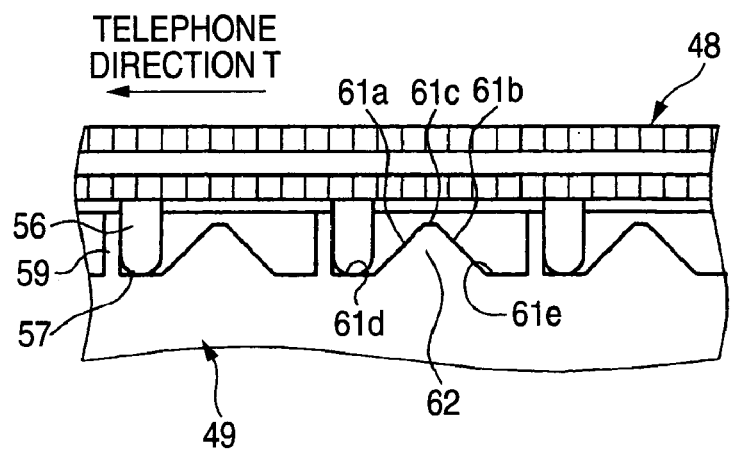
Figure 9A:
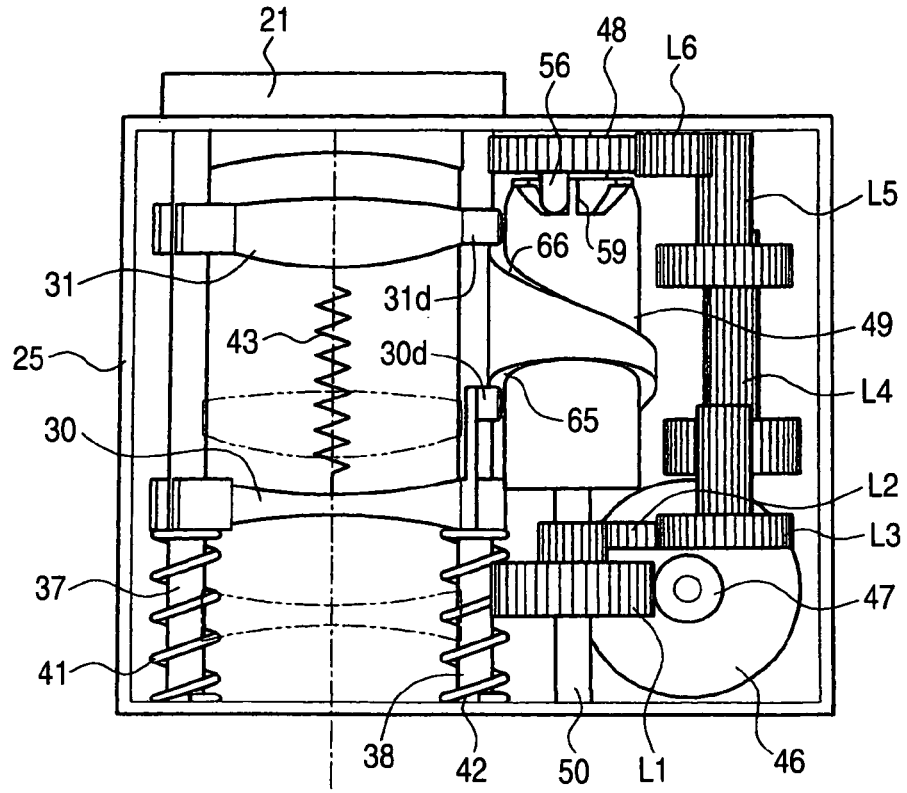
FIGS. 9A and 9B illustrate plane views showing movement of respective portions of the zoom lens apparatus in zoom adjusting and focus adjusting.

For example, when the cam drive gear 48 is pivoted in a wide direction W shown in FIG. 6, as shown by FIG. 7A, one side face 56*a* of the cooperatively moving boss 56 presses one side face 59*a* of the connecting projection 59 to rotate the zoom cam 49 in the clockwise direction of FIG. 4. Thereby, the first lens group 30 is moved to a front end side of the optical axis, the second lens group 31 is moved to a rear end side thereof and therefore, as shown by a bold line in FIG. 9A, a zoom magnification is set to a wide angle side. Further, when the cam drive gear 48 is pivoted in a telephoto direction T, as shown by FIG. 7B, other side face 56*b* of the cooperatively moving boss 56 presses other side face 59*b* of the connecting projection 59 to rotate the zoom cam 49 in the counterclockwise direction of FIG. 4. Thereby, as shown by a two-dotted chain line in FIG. 9A, the first lens group 30 and the second lens group 31 are moved to the front end side in the optical axis direction and the zoom magnification is set to the telephoto side.

When rotation of the cam drive gear 48 is switched from rotation in the wide direction W to rotation in the telephoto direction T shown in FIG. 7B, the cam follower 57 of the cooperatively moving boss 56 is brought into contact with the focus cam 62. In this way, the cooperatively moving boss 56 and the cam follower 57 are integrally formed and therefore, in comparison with the case of providing the cooperatively moving boss 56 and the cam follower 57 separately, a number of pieces of parts can be reduced, which can contribute to small-sized formation and low cost formation.

The zoom cam 49 is press-fitted with, for example, the rotating shaft 50 such that a predetermined amount of friction is generated in rotation. The friction F is smaller than a rotational torque T1 when the cooperatively moving boss 56 of the cam drive gear 48 presses the connecting projection 59 to rotate the zoom cam 49 and is larger than a rotational torque T2 produced in the direction of rotating the zoom cam 49 by pressing the inclined faces 61*a*, 61*b* of the focus cam 62 by the cam follower 57. Therefore, even when the cam follower 57 is brought into contact with the inclined face of the focus cam 62 in switching the rotational direction of the cam drive gear 48 from rotation in the wide direction W to the telephoto direction T, the zoom cam 49 is not rotated but is slid in the axial direction.

Figure 9B:
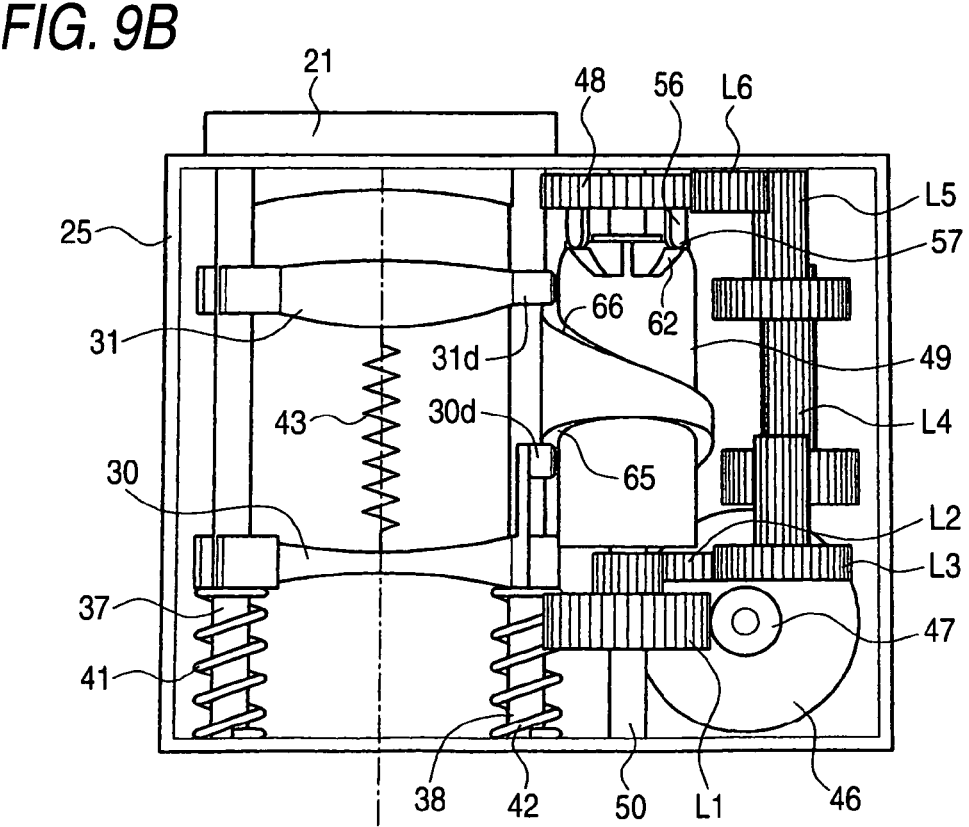

In the sliding, as shown by FIG. 9B, the first cam face 65 presses the cam follower 30*d* of the first lens group 30 in the optical axis direction and the second lens group 31 is moved to the front end side of the optical axis direction such that the cam follower 31*d* is brought into contact with the second cam face 66 by being urged by the tension spring 43. In this way, the first lens group 30 and the second lens group 31 can be moved in the optical axis direction without changing an interval therebetween by utilizing a section of switching the direction of zooming and therefore, by the lens driving mechanism 43 using the single motor 46, focus adjusting can be carried out without changing the zoom magnification.

Figure 10A:
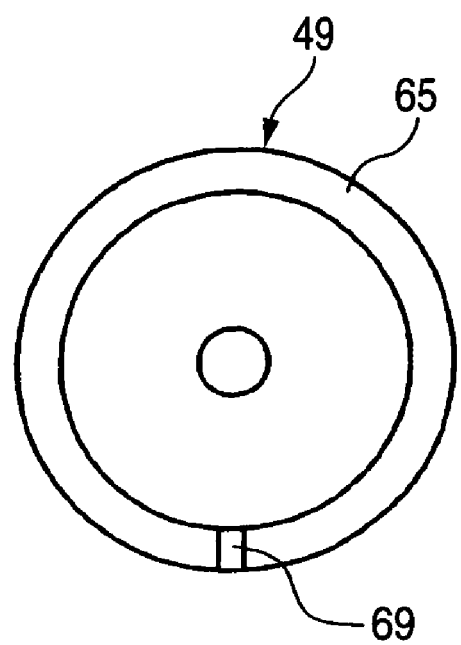
FIGS. 10A and 10B illustrate side views showing end faces of the zoom cam.
Figure 10B:
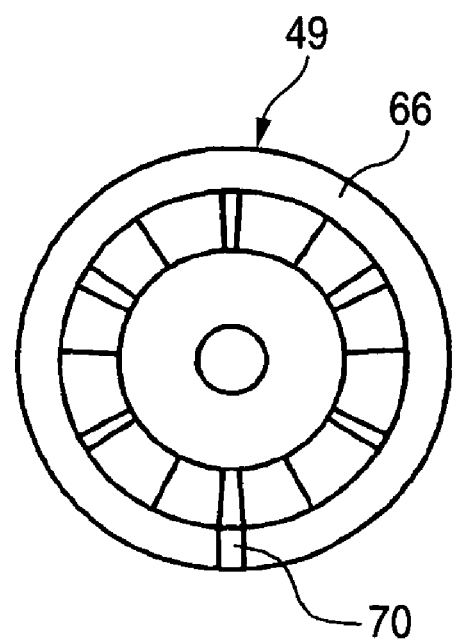

As shown by FIG. 10A constituting a view of an end face on a side of the worm wheel L1 and FIG. 10B constituting a view of an end face of the zoom cam 49 on a side of the focus cam 62, the first cam face 65 and the second cam face 66 are provided with restricting projections 69, 70 projected radially from a rotational center. When the zoom cam 49 is rotated by a predetermined amount or more, the restricting projections 69, 70 are respectively brought into contact with the cam followers 30*d*, 31*d* of the first lens group 30 and the second lens group 31 to stop rotating the zoom cam 49.

As shown by FIG. 2, a system controller 75 controls respective portions of the telephone portion 6 and the camera portion 7 in response to input operation of the various buttons of the operating portion 16. When the cellular phone with a camera 2 is switched to an image taking mode, the system controller 75 reads various programs stored to ROM 77 by way of a data bus 76 to drive respective portions of camera portion 7 in accordance with the programs.

A timing generator (TG) 80 generates a reference panel to input to a CCD driver 81 or the like. The CCD driver 81 drives the image sensor 21 in accordance with the reference pulse. The image sensor 21 outputs an analog image taking signal based on object light incident through the lens groups 30 through 32.

The image taking signal successively outputted from the image sensor 21 is converted into a digital image data by an analog front end chip circuit (AFE) 84 integrated with a correlated double sampling circuit (CDS), a gain variable amplifier (GCA), an A/D converter (ADC) and the like. The image data provided in this way is subjected to a simple image processing for displaying a through image by an image processing circuit 85 and is successively written to an image memory 86. The image data written to the image memory 86 is read by the system controller 75 and displayed as the through image on the LCD panel 11 by an LCD driver 87.

An AF circuit 90 calculates an AF evaluation value from the contrast of one screen of the image data generated by the image processing circuit 85. Generally, the contrast of the image becomes the highest when an object image is brought into a focused state and the AF evaluation value also becomes the highest at this occasion. The AF evaluation value is inputted as an AF evaluation value signal to the system controller 75. The system controller 75 controls a motor driver 91 while always monitoring the AF evaluation value signal inputted successively to move the first lens group 30 and the second lens group 31 to focused positions.

When the shutter button 14 is operated in displaying the through image, the image data at the instance is subjected to a high degree image processing for taking the image by the image processing circuit 85. After processing the image, the image data written to the image memory 86 is read by the system controller 75 and is written to the memory card 18 by way of a media controller 94.

Next, an explanation will be given of an image taking processing of the cellular phone with a camera according to the invention. When an image is taken by using the cellular phone with a camera 2, the receiving portion 4 and the transmitting portion 5 which are folded are brought into a developed state, and an image taking mode is selected by operating the selection button of the operating portion 16. When the image taking mode is selected, there is carried out an original point position setting processing for setting a zoom state of the zoom lens apparatus 20 to a wide position.

In the original point position setting processing, for example, the position in the optical axis direction of the first lens group 30 is confirmed by using an optical sensor or the like, not illustrated. The system controller 75 controls the motor driver 91 to rotate the motor 46 in the counterclockwise direction of FIG. 4. The cam drive gear 48 is rotated in the clockwise direction of the drawing and presses the side face 59a of the connecting projection 59 by the side face 56a of the cooperatively moving boss 56 as shown by FIG. 7A to rotate the zoom cam 49 in the same direction. Thereby, the first lens group 30 and the second lens group 31 are moved to wide positions indicated by the bold line in FIG. 9A. When the system controller 75 receives a detecting signal indicating that the first lens group 30 has finished to move to the wide position, the system controller 75 stops rotating the motor 46 to finish the original point position setting processing.

The LCD panel 11 shows the image of the object incident on the image sensor 21 at a through screen surface and therefore, a user changes the zoom magnification by operating the zoom button 15 while looking at the image, or carries out focusing by depressing the shutter button 14 by a half thereof to carry out framing of the image to be taken. For example, when the zoom button 15 is operated to the telephoto side, the motor 46 starts rotating in the clockwise direction in FIG. 4. The cam drive gear 48 is rotated in the counterclockwise direction of the drawing, as shown by FIG. 7B, the side face 59b of the connecting projection 59 is pressed by the side face 56b of the cooperatively moving boss 56 to rotate the zoom cam 49 in the same direction. Thereby, the first lens group 30 and the second lens group 31 are moved to telephoto positions indicated by two-dotted chain lines in FIG. 9A.

Figure 7C:
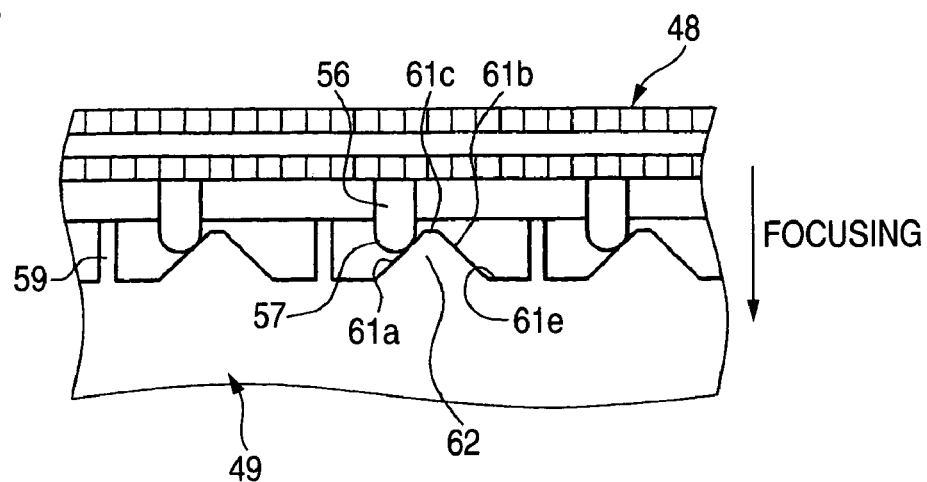

When the shutter button 14 is depressed by the half, the system controller 75 determines the rotational direction of the motor 46 by determining in either of directions from wide to telephoto, or telephoto to wide the current zoom adjusting is carried out. For example, when zoom adjusting is carried out from wide to telephoto as described above, the motor 46 is rotated in a direction reverse to that in zoom adjusting, that is, the counterclockwise direction of FIG. 4. Thereby, the cam drive gear 48 is rotated in the clockwise direction of the drawing and in the midst of rotation, as shown by FIG. 7C, the cam follower 57 is brought into contact with the inclined face 61a of the focus cam 62. The zoom cam 49 is slid to the front end side of the optical axis as shown by FIG. 9B by operation of the rotational torque T2 generated by the cam follower 57 and the inclined face 61a and the friction F in the rotational direction. Thereby, focus adjusting is carried out while maintaining the zoom magnification.

The system controller 75 controls the motor driver 91 while always monitoring the AF evaluation value signal successively inputted from the AF circuit 90 to move the first lens group 30 and the second lens group 31 to the focused positions. In the case of being focused, for example, the case may be displayed on the LCD panel 11, or light may be emitted from a lamp or the like. When the shutter button 14 is operated in displaying the through screen, image data at the instance is subjected to the high degree image processing by the image processing circuit 85 to be written to the memory card 18.

Further, although according to the above-described embodiment, the zoom cam is formed by one part, the zoom cam may be constituted by a plurality of parts. An explanation will be given of a zoom lens apparatus according to a second embodiment in which a zoom cam is constituted by two parts and the cam drive gear is integrated between the constituent parts as follows. Further, the same part names are used for parts having functions the same as those of the zoom lens apparatus according to the first embodiment and a detailed explanation thereof will be omitted.

Figure 11:
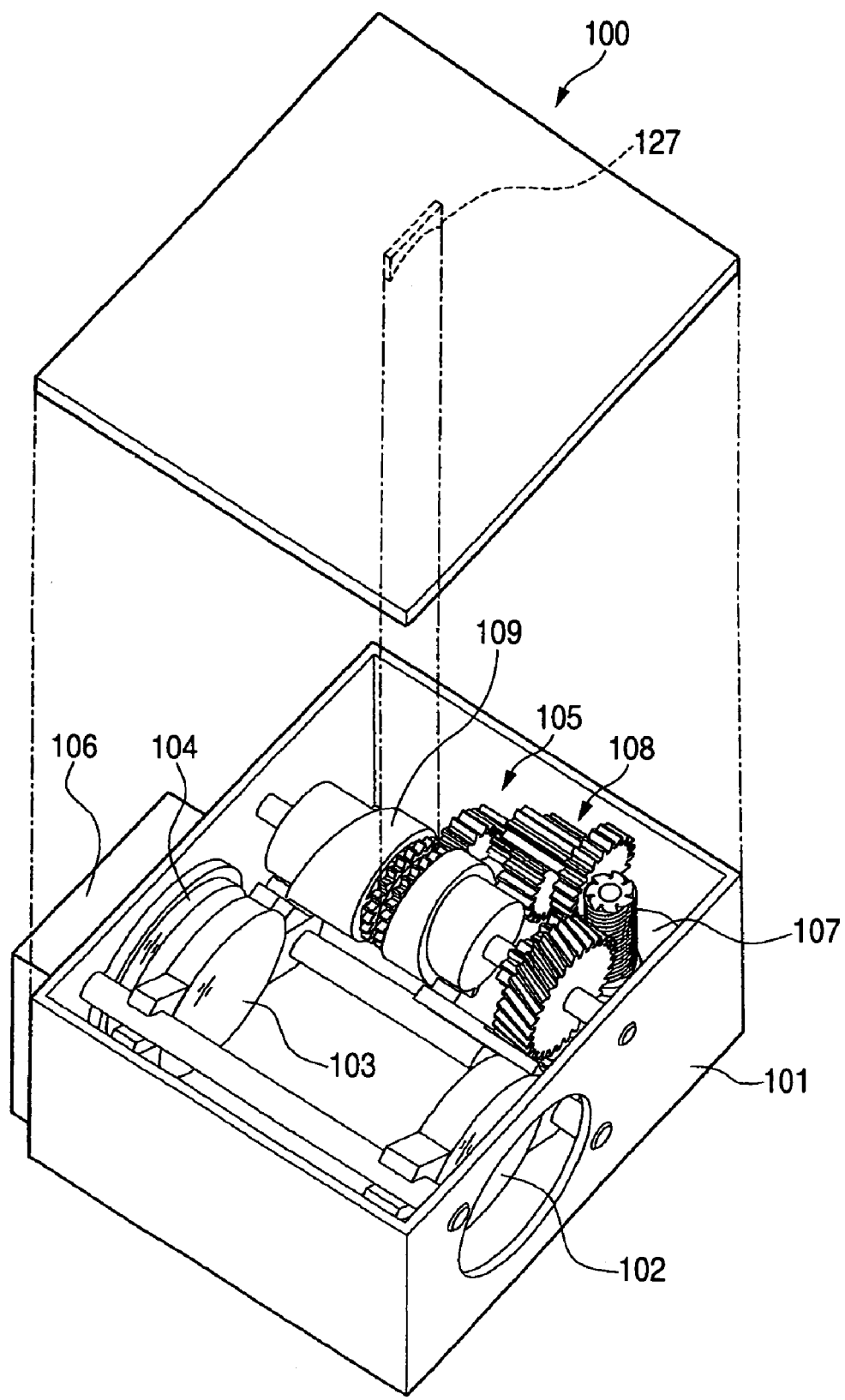
FIG. 11 is a perspective view showing an outlook shape of a zoom lens apparatus according to a second exemplary embodiment.

A zoom lens apparatus 100 shown in FIG. 11 is attached with a first through a third lens group 102 through 104 and a lens driving mechanism 105 at inside of a lens cabinet 101 and attached with an image sensor 106 at a rear face thereof. Similar to the above-described embodiment, the lens driving mechanism 105 is constituted from a motor 107, a plurality of reduction gears 108 for transmitting rotation of the motor 107 by reducing a speed thereof, a zoom cam unit 109 for moving the first lens group 102 and the second lens group 103 in an optical axis direction, and a lid member 110 closing the lens cabinet 101.

Figure 12:
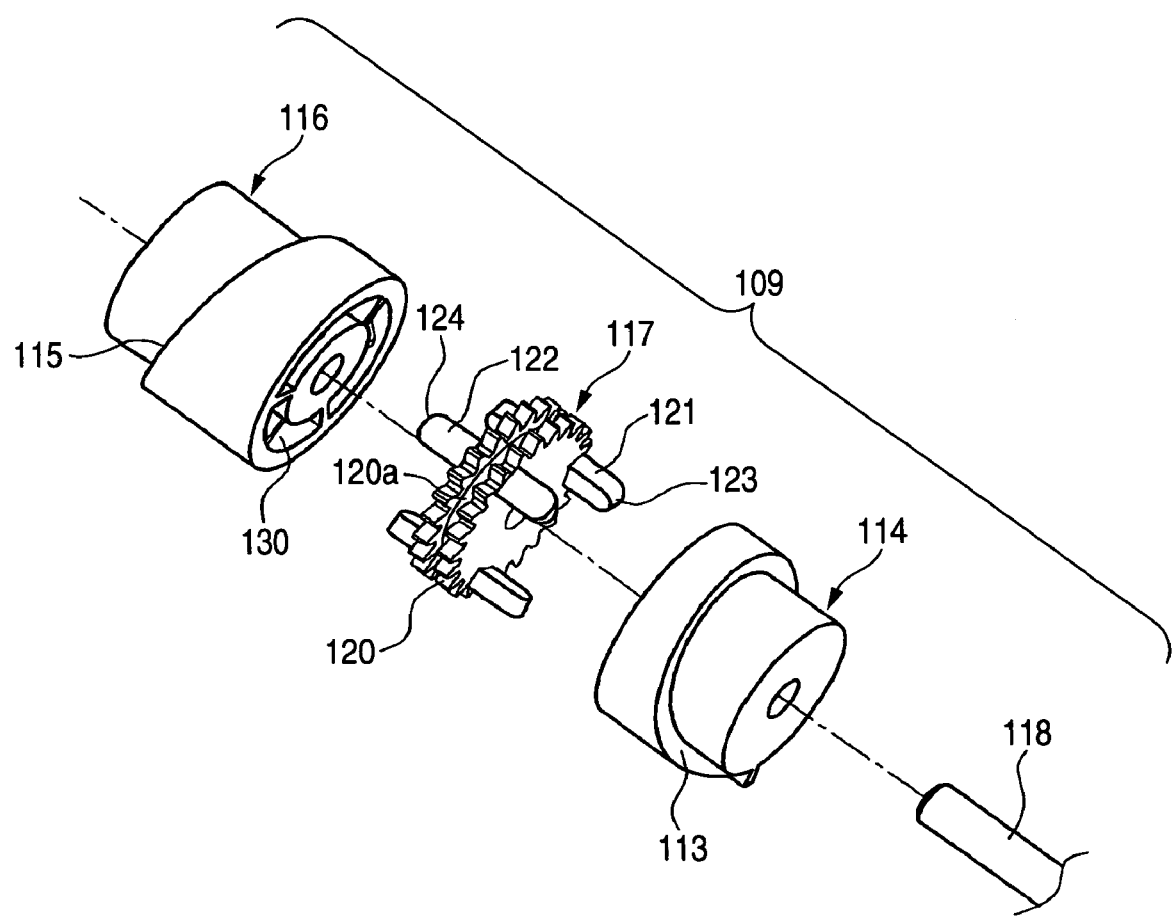
FIG. 12 is a disassembled perspective view showing a constitution of a zoom cam unit.

As shown b FIG. 12, the zoom cam unit 109 is constituted from a first cam member 114 provided with a first cam face 113 for moving the first lens group 102 at an outer periphery thereof, a second cam member 116 provided with a second cam face 115 for moving the second lens group 103 at an outer periphery thereof, and a cam drive gear 117 integrated between the first cam member 114 and the second cam member 116. The first cam member 114 and the second cam member 116, and the cam drive gear 117 are axially supported rotatably by a rotating shaft 118.

The cam drive gear 117 comprises a gear portion 120 transmitted with rotation of the motor 107 by way of the reduction gear 108, and cooperatively moving bosses 121, 122 formed at both end faces of the gear portion 120 by respective 3 pieces thereof. Front ends of the cooperatively moving bosses 121, 122 are respectively formed with cam followers 123, 124 in a shape of a circular arc. The gear portion 120 is provided with a groove portion 120a, the groove portion 120a is inserted with a rib 127 in a shape of a circular arc provided at an inner face of the lid member 110 and therefore, the cam drive gear 117 is not moved in an axial direction.

An end face of the second cam member 116 opposed to the cam drive gear 117 is formed with a groove 130 (as a part of a first connecting and engaging mechanism) for inserting the cooperatively moving boss 122. Further, although not illustrated in details, a similar groove (as a part of a second connecting and engaging mechanism) is formed also at an end face of the first cam member 114 opposed to the cam drive gear 117. Inside of the groove 130 is provided with a connection projection and a focus cam similar to those used in the first embodiment. In zoom adjusting, the cooperatively moving bosses 121, 122 press the connection projections at inside of the groove 130 to rotate the two cam members 114, 116 in the same direction. Thereby, the first lens group 102 and the second lens group 103 are moved in the optical axis direction along the first cam face 113 and the second cam face 115 to change the zoom magnification. Further, in focus adjusting, the cam followers 123, 124 press the focus cams at inside of the groove 130 to slide the first cam member 114 and the second cam member 116 to a front end side in the optical axis direction.

Further, by changing shapes of the focus cams provided in the grooves 130 of the respective cam members 114, 116, in focus adjusting, the first cam member 114 and the second cam member 116 can be moved in the same direction by the same amount, or moving directions and moving amounts thereof can be changed. Further, only either one of the cam members can be moved.

Further, although according to the above-described embodiments, the two lens groups are moved in the optical axis direction by using the zoom cam arranged at sides of the lens groups, the cam may be formed in a cylindrical shape and the lens groups may be integrated to inside thereof. An explanation will be given of a zoom lens apparatus according to a third embodiment integrated with lens groups at inside of a cam in a cylindrical shape, the same part names are used for parts having functions the same as those of the zoom lens apparatus of the respective embodiments and a detailed explanation thereof will be omitted.

Figure 13:
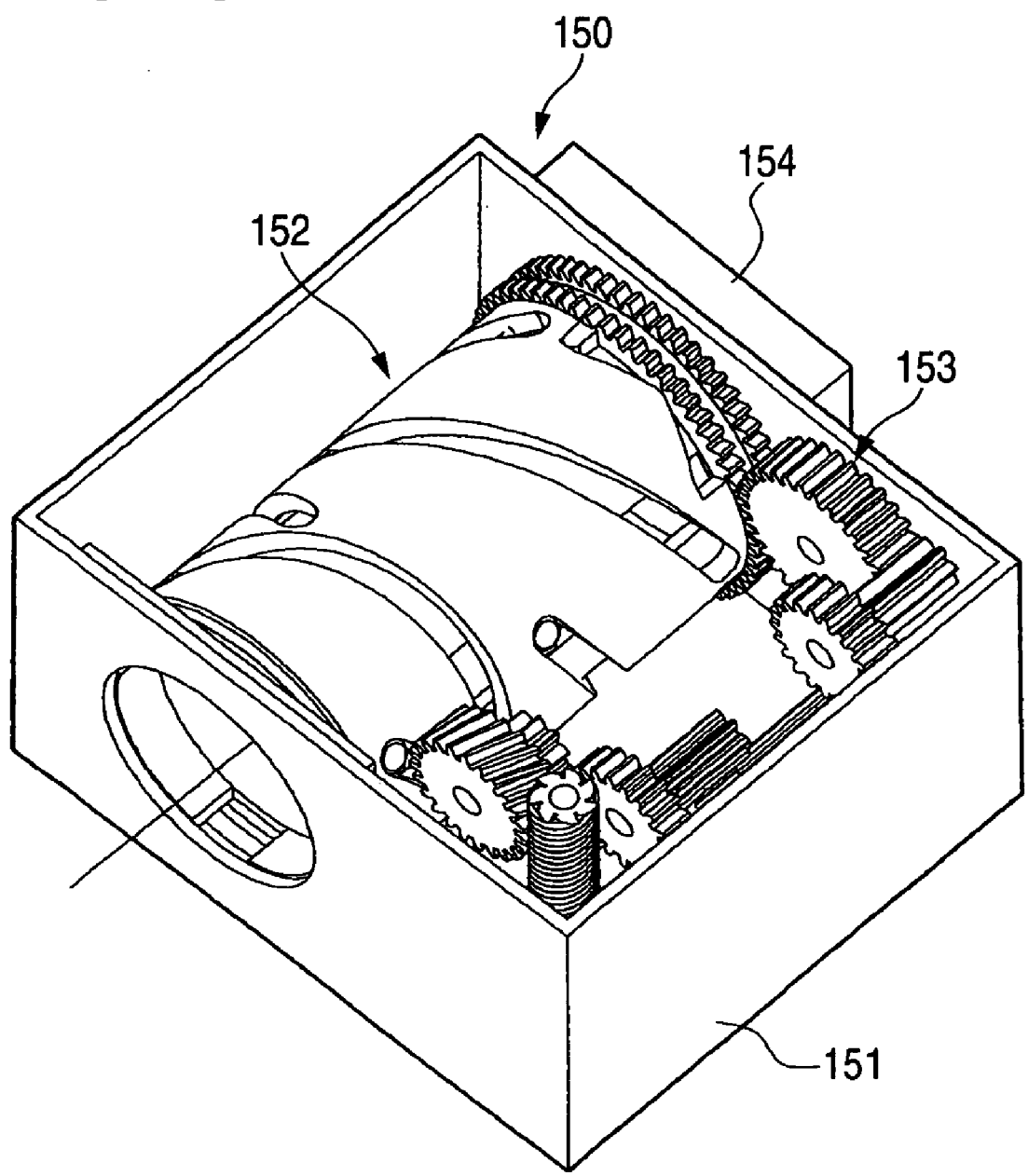
FIG. 13 is a perspective view showing an outlook shape of a zoom lens apparatus according to a third exemplary embodiment.
Figure 14:
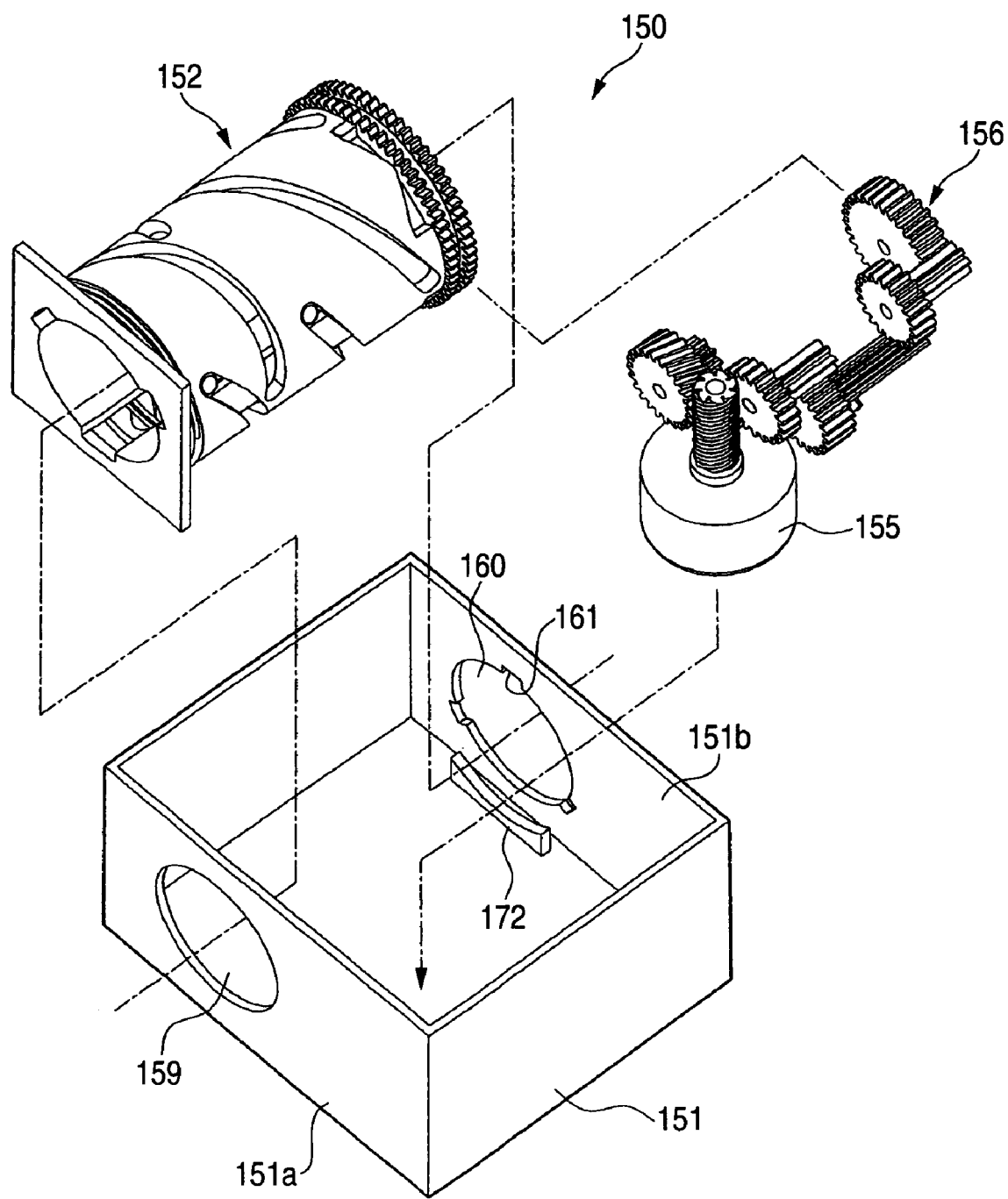
FIG. 14 is a disassembled perspective view showing a constitution of the zoom lens apparatus according to the third embodiment.

A zoom lens apparatus 150 shown in FIGS. 13 and 14 is integrated with a lens barrel 152 and a lens driving mechanism 153 at inside of a lens cabinet 151 and attached with the an image sensor 154 at a rear face thereof. Similar to the above-described embodiments, the lens driving mechanism 153 is constituted by a motor 155, and a plurality of reduction gears 156 for transmitting rotation of the motor 155 by reducing a speed thereof. A front face 151a and a rear face 151b of the lens cabinet 151 are provided with image taking openings 159, 160 in a circular shape. The image taking opening 160 is formed with 3 pieces of notches 161 by which a rear end of the lens barrel 152 is locked.

Figure 15:
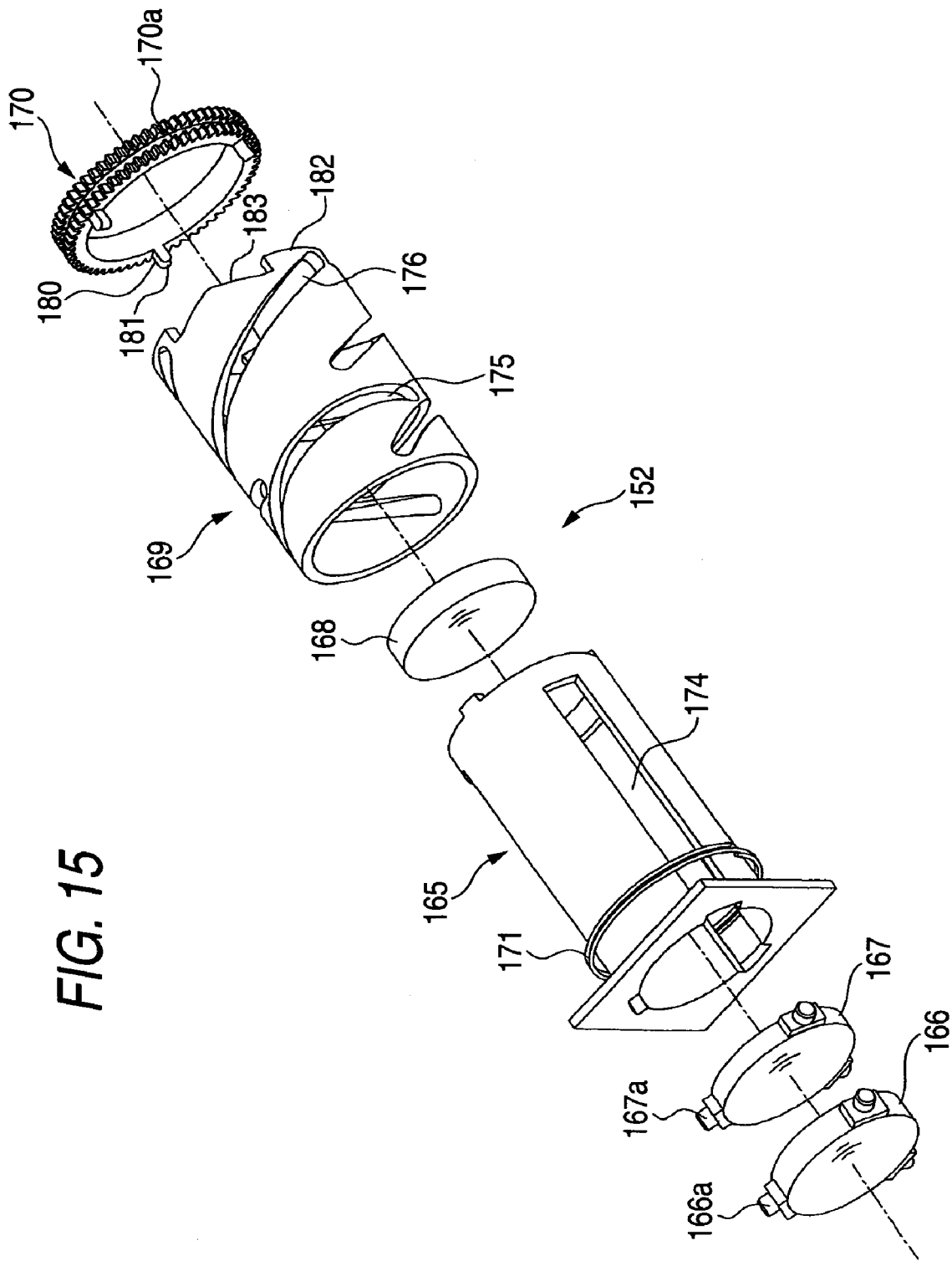
FIG. 15 is a disassembled perspective view showing a constitution of a lens barrel.

As is disintegrated to show in FIG. 15, the lens barrel 152 is constituted by a fixed cylinder 165 fixed at inside of the lens cabinet 151, a first lens group 166 and a second lens group 167 integrated to inside of the fixed cylinder 165, a third lens group 168 integrated to a rear end of the fixed cylinder 165, a cam cylinder 169 inserted through an outer periphery of the fixed cylinder 165, a cam drive gear 170 in a ring-like shape inserted through an outer periphery of the rear end of the fixed cylinder 165 and rotated by the motor 165, and a spring 171 inserted through the fixed cylinder 165 for pressing the cam cylinder 169 to a rear side in an optical axis.

A tooth face portion of the cam drive gear 170 is formed with a groove portion 170a, the groove portion 170a is inserted with a rib 172 in a shape of a circular arc provided at a lower face of the lens cabinet 151, and movement of the cam drive gear 170 in the axial direction is restrained. The rib 172 is inserted to the groove portion 170a by being accompanied by integrating the lens barrel 152 into the lens cabinet 151 and therefore, a number of integrating steps is not increased.

The outer periphery of the fixed cylinder 150 is formed with 3 pieces of straight advancing grooves 174 inserted with cam followers 166a, 167a of the first lens group 166 and the second lens group 167. The outer periphery of the cam cylinder 169 is formed with 3 pieces of cam grooves 175, 176 in a circular arc shape respectively inserted with the cam followers 166a, 167a. Thereby, when the cam cylinder 169 is rotated on the outer periphery of the fixed cylinder 165, the first lend group 166 and the second lens group 167 are moved in the optical axis direction along the cam grooves 175 and 176.

A front end face of the cam drive gear 170 is provided with 3 pieces of cooperatively moving bosses 180, and front ends of the cooperatively moving bosses 180 are provided with cam followers 181 in a shape of a circular arc. A rear end of the cam cylinder 169 is formed with 3 pieces of connecting projections 182 and focus cams 183 arranged between the respective connecting projections 182. In zoom adjusting, the cooperatively moving boss 180 presses the connecting projection 182 to rotate the cam cylinder 169 to move the first lens group 166 and the second lens group 167 in the optical axis direction by following the respective cam grooves 175, 176. Further, in focus adjusting, the cam follower 181 presses the focus cam 182 to move the cam cylinder 169 to a front end side in the optical axis direction. Thereby, focus adjusting is carried out without changing zoom magnification.

According to the zoom lens apparatus 150 using the cam cylinder 169, the cam cylinder 169 is rotated when the cam cylinder 169 is moved in the optical axis direction in focus adjusting unless friction between the fixed cylinder 165 and the cam cylinder 169 is pertinently set. Therefore, when the friction cannot be set pertinently, the zoom lens apparatus 150 may be changed to a zoom lens apparatus of a step type.

Figure 16:
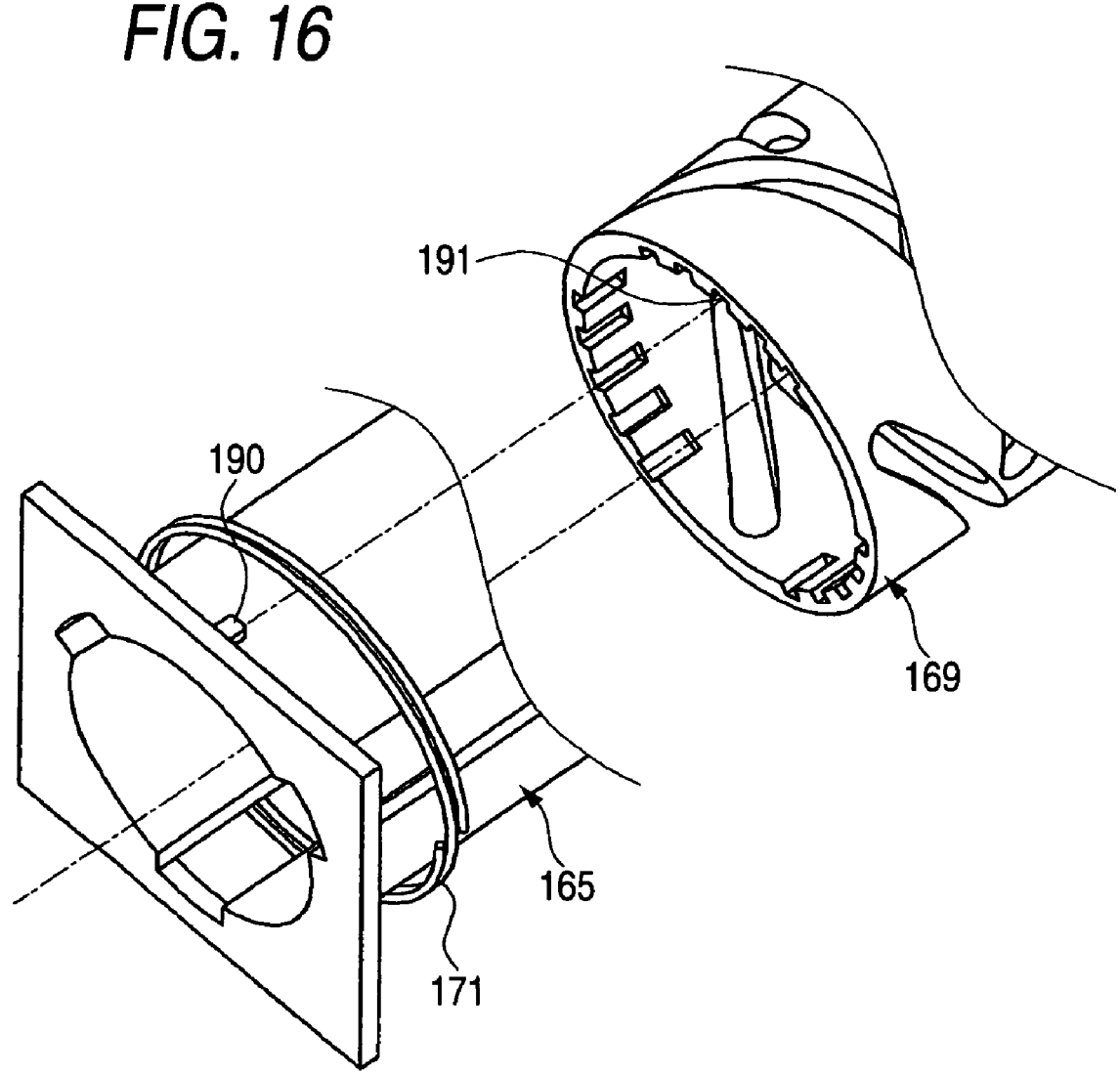
FIG. 16 is a perspective view showing shapes of a projection and a groove for restricting rotation of a cam cylinder.

As is well known, the zoom lens apparatus of the step type is constituted by a type in which zoom magnification is changed in steps, and positions of stopping the cam cylinder 169 at respective zoom positions are previously determined. As shown by FIG. 16, for example, a projection 190 is formed at an outer peripheral face of the front end of a fixed cylinder 165, and an inner face of a front end of a cam cylinder 169 is formed with grooves 191 to be inserted with the projection 190 in accordance with respective zoom positions. The projection 190 and each groove 191 are necessarily opposed to each other when the zoom magnification is changed and rotation of the cam cylinder 169 is stopped and therefore, when the cam cylinder 169 is moved to a front end side of the optical axis in focus adjusting, the projection 190 is brought into the groove 191 and rotation of the cam cylinder 169 can be restricted.

Further, the cam cylinder 169 is urged to a rear side of the optical axis by the spring 171 and therefore, when the cam cylinder 169 is rotated in zoom adjusting, the projection 190 and the groove 191 are not engaged with each other. Further, although the projection 190 is formed at the fixed cylinder 165 and the groove 191 is formed at the cam cylinder 169, the arrangement may be reversed.

Although according to the above-described respective embodiments, the cam drive gear is provided with the cooperatively moving boss and the cam follower constituting the first connecting and engaging members and the zoom cam is provided with the second and third connecting and engaging members and the focus cam, the arrangement may be reversed. Further, although the pulse motor is used as the motor, other motor of a DC motor or the like may be used. Further, although an explanation has been given by taking an example of the cellular phone with a camera, the invention can be used as a zoom lens apparatus of normal digital camera, a video camera, a silver salt camera or the like.

It will be apparent to those skilled in the art that various modifications and variations can be made to the described embodiments of the invention without departing from the spirit or scope of the invention. Thus, it is intended that the invention cover all modifications and variations of this invention consistent with the scope of the appended claims and their equivalents.

The present application claims foreign priority based on Japanese Patent Application No. JP2005-92454 filed Mar. 28 of 2005, the contents of which is incorporated herein by reference.

What is claimed is:

1. A zoom lens apparatus comprising:
a first lens group and a second lens group each arranged on an optical axis;
supporting unit that supports the first lens group and the second lens group so that each of the first and second lens groups can move in a direction of the optical axis;
a motor that is regularly rotated when the first lens group and the second lens group are moved to wide angle positions and that is reversely rotated when the first lens group and the second lens group are moved to telephoto positions;
a cam drive gear that is rotated in a first direction by regularly rotating the motor and that is rotated in a second direction by reversely rotating the motor;
a zoom cam rotatably and slidably supported on a rotational axis in parallel with the optical axis, the zoom cam being connected and engaged with the first lens group and the second lens group to move in the optical axis direction; and
a connecting and engaging mechanism between the cam drive gear and the zoom cam, wherein
the connecting and engaging mechanism transmits one of rotation of the drive gear in the first direction and rotation of the drive gear in the second direction to the zoom cam, so as to perform zoom adjusting, and
the connecting and engaging mechanism includes a nontransmitting section in which rotation of the cam drive gear is not transmitted to the zoom cam, and when a rotational direction is switched between the first direction and the second direction, the zoom cam slides in the axial direction by rotation of the cam drive gear in the nontransmitting section, so as to perform focus adjusting.

2. The zoom lens apparatus according to claim 1, wherein the cam drive gear and the zoom cam are coaxially disposed.

3. The zoom lens apparatus according to claim 1, wherein the zoom cam is proximate to sides of the first lens group and the second lens group.

4. The zoom lens apparatus according to claim 1, which comprises a gear train between the motor and the cam drive gear, the gear train comprising a plurality of gears transmitting rotation of the motor to the cam drive gear, wherein the plurality of gears includes at least one reduction gear, and the at least one reduction gear and the zoom cam are coaxially arranged.

5. The zoom lens apparatus according to claim 1, wherein the zoom cam comprises: a first zoom cam that moves the first lens group in the optical axis direction; and a second zoom cam that moves the second lens group in the optical axis direction,
the cam drive gear is between the first zoom cam and the second zoom cam, and
the connecting and engaging mechanism comprises: a first connecting and engaging mechanism between the first zoom cam and the cam drive gear; and a second connecting and engaging mechanism between the second zoom cam and the cam drive gear, each of the first and second connecting and engaging mechanism.

6. The zoom lens apparatus according to claim 1, wherein the supporting unit is a fixed cylinder that contains therein the first lens group and the second lens group and that supports the first lens group and the second lens group to be able to move in the optical axis direction;
wherein the zoom cam is a cam cylinder in a cylindrical shape rotatably and slidably inserted through an outer periphery of the fixed cylinder, the cam cylinder having cam grooves at an outer periphery thereof, the cam grooves being inserted with cam followers of the first lens group and the second lens group; and
wherein the first lens group and the second lens group are moved in the optical axis direction by rotating the cam cylinder by the connecting and engaging mechanism so as to perform zoom adjusting, and focus adjusting is performed by sliding the cam cylinder on the fixed cylinder by the connecting and engaging mechanism.

7. The zoom lens apparatus according to claim 6, wherein the cam drive gear has a ring shape having an opening rotatably inserted through the outer periphery of the fixed cylinder.

8. The zoom lens apparatus according to claim 6, which is a step zoom lens apparatus capable of providing zoom amplifications by stopping the cam cylinder at a plurality of stopping positions, wherein a plurality of grooves in correspondence with the stopping positions of the cam cylinder are provided at one of the fixed cylinder and the cam cylinder, a plurality of projections is provided at the other of the fixed cylinder and the cam cylinder, and the plurality of projections are inserted to the plurality of grooves when the cam cylinder slides on the fixed cylinder in focus adjusting so as to hamper the cam cylinder from being rotated in sliding on the fixed cylinder.

9. The zoom lens apparatus according to claim 1, wherein the connecting and engaging mechanism comprises:
a first connecting and engaging member in one of the cam drive gear and the zoom cam;
a cam follower in one of the cam drive gear and the zoom cam
a second connecting and engaging member disposed at the other of the cam drive gear and the zoom cam, the second connecting and engaging member coming into contact with the first connecting and engaging member when the cam drive gear is rotated in the first direction to transmit rotation of the cam drive gear to the zoom cam;
a third connecting and engaging member at a position remote from the second connecting and engaging member by more than a width of the first connecting and engaging member, the third connecting and engaging member coming into contact with the first connecting and engaging member when the cam drive gear is rotated in the second direction to transmit rotation of the cam drive gear to the zoom cam; and
a focus cam between the second connecting and engaging member and the third connecting and engaging member, the focus cam being pressed by the cam follower during a time period until the first connecting and engaging member and the second or the third connecting and engaging member are brought into contact with each other after switching the rotational direction of the cam drive gear; and
wherein the focus cam includes a cam face, a position of a face of which is changed in the axial direction of the zoom cam, and the zoom cam slides in the axial direction by pressing the focus cam by the cam follower.

10. The zoom lens apparatus according to claim 9, which satisfies a relationship:

$$T1 > F > T2$$

Wherein F represents a friction of the zoom cam in the rotational direction; T1 represents a rotational torque generated when the cam drive gear rotates the zoom cam; and T2 represents a rotational torque generated in the rotational direction of the zoom cam when the cam follower presses the focus cam.

* * * * *